(12) United States Patent
Legrand et al.

(10) Patent No.: US 10,786,975 B2
(45) Date of Patent: Sep. 29, 2020

(54) LAMINATED GLASS

(71) Applicant: AGC GLASS EUROPE, Louvain-la-Neuve (BE)

(72) Inventors: Denis Legrand, Wargnies (FR); Yuji Masaki, Kraainem (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 204 days.

(21) Appl. No.: 15/537,242

(22) PCT Filed: Dec. 16, 2015

(86) PCT No.: PCT/EP2015/080086
§ 371 (c)(1),
(2) Date: Jun. 16, 2017

(87) PCT Pub. No.: WO2016/097047
PCT Pub. Date: Jun. 23, 2016

(65) Prior Publication Data
US 2017/0361576 A1 Dec. 21, 2017

(30) Foreign Application Priority Data
Dec. 19, 2014 (EP) .................................... 14199140

(51) Int. Cl.
*G02B 27/00* (2006.01)
*B32B 17/10* (2006.01)

(52) U.S. Cl.
CPC .. *B32B 17/10183* (2013.01); *B32B 17/10036* (2013.01); *B32B 17/1066* (2013.01);
(Continued)

(58) Field of Classification Search
CPC . G02B 1/10; G02B 1/105; G02B 1/11; G02B 1/115; G02B 1/116; G02B 5/00; G02B 5/003; G02B 5/20; G02B 5/208; G02B 5/22; G02B 5/26; G02B 5/28; G02B 5/282; G02B 27/00; B06J 1/00;
(Continued)

(56) References Cited

U.S. PATENT DOCUMENTS 6,055,088 A 4/2000 Fix et al.
6,466,298 B1 10/2002 Fix et al.
(Continued)

FOREIGN PATENT DOCUMENTS

| GB | 2 264 452 | * | 1/1993 | ............ B32B 17/10 |
| WO | 2014/135467 A1 | | 9/2014 | |

OTHER PUBLICATIONS

International Search Report dated Feb. 24, 2016 in PCT/EP2015/080086 filed Dec. 16, 2015.

*Primary Examiner* — Thong Q Nguyen
(74) *Attorney, Agent, or Firm* — Oblon, McClelland, Maier & Neustadt, L.L.P.

(57) ABSTRACT

A laminated glass includes a first glass sheet, an electrically powered functional film, a reflective element to reflect infrared radiation, disposed between the first glass sheet and the functional film, at least one first thermoplastic interlayer disposed between the reflecting element and the functional film, and a second glass sheet. The laminated glass includes at least one interlayer including a zone that is opaque to radiation in the visible wavelength.

13 Claims, 3 Drawing Sheets

(52) U.S. Cl.
CPC .. *B32B 17/10174* (2013.01); *B32B 17/10348* (2013.01); *B32B 17/10504* (2013.01); *B32B 17/10532* (2013.01); *B32B 17/10761* (2013.01); *B32B 17/10788* (2013.01); *G02B 27/0018* (2013.01)

(58) Field of Classification Search
CPC . B06J 1/02; B32B 17/10; B32B 15/04; B32B 17/06; B32B 17/10036; B32B 17/1066; B32B 17/10651; B32B 17/10761; B32B 17/10183; B32B 17/10348
See application file for complete search history.

(56) References Cited

U.S. PATENT DOCUMENTS

| | | | |
|---|---|---|---|
| 6,538,192 B1 * | 3/2003 | Coster | B32B 17/10036 |
| | | | 136/251 |
| 6,625,875 B2 * | 9/2003 | Sol | B32B 17/10174 |
| | | | 29/621 |
| 10,449,837 B2 * | 10/2019 | Legrand | B32B 17/10036 |
| 2005/0227061 A1 | 10/2005 | Slovak et al. | |
| 2009/0176101 A1 | 7/2009 | Greenall et al. | |
| 2009/0219468 A1 * | 9/2009 | Barton | B32B 17/10761 |
| | | | 349/104 |
| 2009/0233121 A1 * | 9/2009 | Leconte | B32B 17/10 |
| | | | 428/626 |
| 2009/0279004 A1 | 11/2009 | Greenall et al. | |
| 2011/0181939 A1 * | 7/2011 | Bressand | B32B 17/10036 |
| | | | 359/270 |
| 2012/0025559 A1 * | 2/2012 | Offermann | B32B 17/10036 |
| | | | 296/84.1 |
| 2012/0175908 A1 * | 7/2012 | McCarthy | B32B 17/10036 |
| | | | 296/84.1 |
| 2014/0362434 A1 * | 12/2014 | Schmitz | H05B 3/84 |
| | | | 359/350 |
| 2017/0341347 A1 * | 11/2017 | Nakamura | B32B 17/10036 |
| 2018/0037094 A1 * | 2/2018 | Legrand | B32B 17/10036 |

* cited by examiner

PRIOR ART

LAMINATED GLASS

TITLE

BACKGROUND

The present invention relates to a laminated glazing, in particular a laminated glazing intended to be used as glazing for the motor vehicle industry, for example as roof, windshield, rear window or side window of a vehicle.

However, even if the invention is first intended for the application to motor vehicle glazings, it also relates to other types of glazings and generally to any glazing comprising a functional film, in particular when these glazings exhibit constraints, in their composition or in their use, in particular as regards heat treatments. For simplicity, the continuation of the description refers essentially to motor vehicle glazings and in particular to glazed roofs for motor vehicles, it being understood that this does not limit the subject matter of the invention.

Glazed roofs are increasingly substituting for conventional roofs which are part of the body of vehicles. The choice of these roofs is a result of manufacturers offering to their customers this option, which makes the vehicle seem like it opens onto the exterior, like a convertible, without the disadvantages of convertibles, these roofs maintaining the comfort levels of a conventional sedan. For this, glazed roofs must satisfy many requirements.

The aim of choosing glazed roofs is in particular to increase the brightness in the passenger compartment. This increase must not be obtained at the expense of other properties which ensure the comfort of the passengers, in particular the thermal comfort and the acoustic comfort. The latter is retained, indeed even improved, by the presence of the laminated structure, in particular when the latter comprises interlayers chosen for their ability to deaden vibrations, on the model of what is employed in particular for windshield glazings.

The presence of glazed roofs, motivated by the increase in the brightness, results in an increase in heat transfers with the exterior. This is substantial in the greenhouse effect mechanism when the vehicle is exposed to intense solar radiation but also in the heat losses from the passenger compartment in cold periods.

Control of the thermal conditions results in various measures, including the use of high-selectivity glazings. These conditions result from the choice of the glasses used (most often mineral glasses, but also possibly organic glasses). They are also the result of the additional filters which these glazings comprise, in particular those consisting of systems of layers selectively reflecting infrared radiation. Solutions meeting these requirements are known from the prior art. This is the case in particular of the patent EP 1 200 256.

Moreover, the desire for an increase in the brightness of the passenger compartment may not always be present. The user may, depending on the moment, prefer a reduced brightness or simply to maintain the "private" nature.

Solutions have been proposed previously for modifying the light transmission of glazings as a function of the conditions of use. It may be a question in particular of "electrically controlled" glazings, such as glazings comprising functional films, such as electrochromic means in which the variation is obtained by modifying the state of colored ions in compositions included in these glazings. It may also be a question of glazings comprising layers of particles in suspension, which, depending on the application of an electric voltage, are or are not ordered, such as SPD (Suspended Particles Devices) systems, or also a film of liquid crystal (LC) type, consisting of a polymer containing liquid crystals sensitive to the application of the electric voltage.

In particular, these functional films, while they make possible a modification to the intensity of the brightness in the passenger compartment, have the function of modifying the private nature and the antiglare effect. In particular, these functional films are films which can switch between a dark state and a translucent, indeed even transparent, state or also which is capable of providing a lighting function inside a vehicle in which the glazing is fitted.

In the prior literature, the use of liquid crystal films in glazings has been envisaged for forming controlled visual isolation walls. In these applications, the main function is the transformation of an essentially transparent glazing into a simply translucent glazing. These applications did not involve specific thermal characteristics. Likewise, the light transmission was not determining.

Examples of glazings comprising an SPD film are also known in the literature. Such glazings are, for example, described in the documents WO2005/102688 and DE 100 43 141. The film can switch between a dark state (in the absence of applied voltage) and a highly transparent state (when a voltage is applied).

Generally, whether this is a functional film of SPD type or of liquid crystals (LCs) or a film comprising light-emitting diodes, the film is laminated in a laminated glazing structure by virtue of at least one thermoplastic interlayer. This use is, for example, described in the document US2004/0257649.

Such laminated glazings having variable properties of light transmission due to the inclusion of a film of liquid crystals (LCs) or an SPD film are increasing desired due to the improvement in the comfort of the passenger. This is because, once fitted in a vehicle, this glazing provided with such a film makes it possible to reduce the heat in the passenger compartment of the vehicle but also makes it possible to adjust the brightness desired inside the vehicle.

Unfortunately, these functional films, when they are incorporated in a laminated glazing, deteriorate as a result of their sensitivity to the high temperatures to such an extent that the performance of each is affected.

Generally, in the preparation of the roofs according to the invention, it is advisable to consider the ability of the constituent elements to withstand the treatments which result in the shaping and in the assembling of the glazing. In practice, the SPD films or also the liquid crystal (PDLC) films are sensitive to the rise in temperature. Above 70° C., they are generally no longer controlled by the variations in electric fields. However, this modification is reversible, so that the heat treatments resulting from their assembling in the laminate do not detrimentally affect them. The treatment in question is generally that of passing through an oven at approximately 130° C. However, sometimes the laminating temperature can bring about a permanent deterioration in the optical performance of the functional film, such as a PDLC film, SPD film, and the like, and, when it is subjected to prolonged exposure to heat, in particular to temperatures of greater than 70° C. and more particularly of greater than 80° C., the zone located at the edge of the functional (PDLC, SPD, and the like) film can be damaged and result in a detrimental change in the film and in particular in the switching function, for example.

Prolonged exposure to such temperatures results in particular from the application of an electric field to activate the film and/or from the heat conducted through the glass sheets and the enamel layer, or also from solar radiation.

Thus, the functional film, when it is incorporated in a laminated glazing and positioned on a vehicle, in particular as glazed roof, the functional film advantageously has to withstand high temperatures which can reach temperatures of greater than 85° C. Above this temperature, and for prolonged exposure, the functional film deteriorates. This temperature is in particular reached when the functional film is in the active position (ON position). Thus, the functional film, when it is incorporated in a multiple glazing, has to be protected from the rises in temperatures.

For simplicity, the numbering of the glass sheets in the continuation of the description refers to the numbering nomenclature conventionally used for glazings. Thus, the face of the laminate which is in contact with the environment external to the vehicle is known as being the face 1 and the surface in contact with the internal medium, that is to say the passenger compartment of the vehicle, is known as face 4, the functional film being positioned between the faces 2 and 3, where it can be protected from damage.

In order to avoid any doubt, the terms "external" and "internal" refer to the orientation of the glazing during the installation as glazing in a vehicle.

Conventionally, laminated glazings for a motor vehicle are printed over the entire periphery of the edges of the glazing on face 2 to form an occultation strip, in order, on the one hand, to protect, from UV radiation, the glue which makes it possible to adhere all the busbars and electrical connectors between the functional film and the cable harness of the vehicle and, on the other hand, to conceal these elements.

The aim of the strip is twofold: on the one hand, esthetics, as, from the outside, none these elements is visible from the outside and, on the other hand, to prevent damage to the glue or other components from exposure to UV radiation. The occultation strip can also serve to conceal the edges of the functional film.

Generally, the printing used is enamel screen printing. This is because the enamel makes it possible to provide the required optical qualities and sufficient concealment of the elements, such as those mentioned above.

However, screen printing on glass sheets is not without disadvantages. In a laminate, the enamel is screen printed on the internal face of the glass sheet intended for the external position, that is to say in contact with the atmosphere, known as face 2, and/or on the external face of the glass sheet intended for the internal position, known as face 4, which is in contact with the internal atmosphere, in particular of the passenger compartment of a vehicle.

One of the disadvantages of the enamelling on the internal face 2 in the structure of the laminated glazing is that the enamel absorbs infrared rays, resulting in an increase in the temperature of the laminated glazing and thus, consequently, in a deterioration in the functional film which is sensitive to high temperatures. Furthermore, the enamel does not absorb the same amount of heat as the glass. The heating thus has to be modified for each laminated glazing configuration, such as glazed roofs, windshield, with and without detector of rain, of brightness, and the like.

BRIEF SUMMARY

Thus, the invention consists in replacing the screen printing normally used on at least the face 2 in order to generally conceal the edge of the glazings with a thermoplastic interlayer film comprising a zone that is opaque to visible wavelength radiation.

It is understood that the thermoplastic interlayer that is opaque to visible wavelength radiation can also be positioned on the face 4 or any other position.

A zone that is opaque to visible wavelength radiation is understood to mean a zone, the light transmission of which is less than 5% and preferably equal to 0% of the incident light. This opaque zone, in contrast to the enamel, makes it possible simultaneously to conceal elements, such as connections (busbars), the glue, and the like, as would be done by the enamel, but in particular prevents the absorption of infrared radiation and thus to make it possible to protect the functional film from heat (i.e., high temperatures).

For the sake of simplicity, in the remainder of the description, the term "the opaque zone" will refer to the zone that is opaque to visible wavelength radiation.

Very obviously, this process modification does not affect the specifications of the final product: compliance with the standards and specifications clients, not only from a mechanical strength or aging viewpoint but also from an esthetic viewpoint.

It is thus an aim of the invention to make available a means for protecting a functional film from heat, when the functional film is incorporated in a laminated glazing, while making it possible to conceal elements, such as busbars, connections, and the like, as is conventionally done by the enamel used in motor vehicle glasses.

This aim is achieved by the invention, a subject matter of which is a laminated glazing comprising:
a. a first glass sheet,
b. an electrically powered functional film,
c. a means for reflecting infrared radiation positioned between the first glass sheet and the electrically powered functional film,
d. at least one first thermoplastic interlayer positioned between the means for reflecting infrared radiation and the functional film,
e. a second glass sheet.

According to the invention, the laminated glazing comprises at least one first interlayer comprising a zone that is opaque to visible wavelength radiation.

According to a preferred embodiment of the invention, said opaque zone extends over the whole of the periphery of the glass sheet to which it is applied, just like the enamel layer. This opaque zone thus substitutes for the enamel conventionally used.

According to a specific embodiment of the invention, the opaque zone can extend over a wide portion of the laminated glazing.

According to a preferred embodiment of the invention, said opaque zone extends over the whole of the periphery of the internal face of the external glass sheet, that is to say on face 2.

By virtue of the invention, the functional film comprised between at least two glass sheets is protected from the heat originating in particular from the absorption of the infrared radiation by the glass sheets which, during the heating stage during the lamination process and/or from the application of an electric field in order to activate the film and/or from the heat conducted through the glass sheets or also from solar radiation. The functional films, such as PDLCs and SPDs, are sensitive both to the temperature and to the humidity; thus, the performance levels of these films may be affected. For example, the lifetime of the functional film can be significantly reduced if it is subjected to high temperatures for a prolonged time.

According to a preferred embodiment of the invention, the functional film can be detrimentally affected at a high temperature. For example, such a film comprises liquid crystals dispersed in a polymer (PDLC) or also particles dispersed in suspension in a polymer (SPD). By virtue of the invention, the duration of the half life of the light-emitting device can be increased.

High temperature is understood to mean temperatures of greater than 60° C. and preferably temperatures of greater than 80° C. The functional film subjected in a prolonged manner to such temperatures deteriorates. It is thus necessary to greatly reduce, indeed even eliminate, the absorption of infrared radiation by the glass sheet which will be placed on the exterior side of the vehicle as infrared radiation is then conducted toward the functional film.

Generally, the functional film is insufficiently protected from infrared radiation at the edges of the laminated glazing in which it is incorporated as, usually, an enamel layer is present in order to conceal the edges but this enamel layer is present in the laminated glazing before the layer reflecting infrared radiation. Thus, the edge of the glazing can reach temperatures of greater than 100° C. which, in the long run, damage the functional film.

By virtue of the invention, the temperatures measured at the edges of the glazing, at the opaque zone, are less than 100° C. and preferably less than 90° C. and more preferably still less than 85° C. Thus, the functional film is no longer subjected to high temperatures which, in the long run, result in damage to the functional film.

According to a preferred embodiment of the invention, the thermoplastic interlayer comprising an opaque zone is formed from an opaque frame positioned around the non-opaque zone.

According to a specific embodiment of the invention, a thermoplastic interlayer opaque in its entirety and of a size making possible the lamination of the glass sheets together can be emptied of its central part in order to form a frame. The central part is then replaced with a nonopaque or transparent thermoplastic interlayer. These two parts, during the lamination process, will fuse so as to form a single part. Advantageously, the frame is formed of strips of opaque interlayer, for example a PVB and/or an EVA, colored black throughout, juxtaposed, the strips being positioned around a central part of a thermoplastic interlayer; the parts will fuse together so as to form the thermoplastic interlayer, which will extend over the entire periphery of the glass sheets.

Thus, the thermoplastic interlayer according to the invention comprises an opaque zone which makes it possible to protect the functional film from infrared radiation, this opaque zone surrounding an opaque zone.

The at least one thermoplastic interlayer can be of any material known in the art capable of forming a laminate. It can be an ethylene/vinyl acetate, polyurethane, polycarbonate, polyvinyl butyral or polyvinyl chloride copolymer or a copolymer of ethylene and of methacrylic acid. According to a preferred embodiment of the invention, the thermoplastic interlayer comprising a zone that is opaque to visible wavelength radiation is a sheet of polyvinyl butyral (PVB) or of ethylene/vinyl acetate (EVA).

It is generally available in a thickness of between 0.38 and 1.1 mm but most often of 0.76 mm.

According to a preferred embodiment of the invention, the thermoplastic interlayer comprising an opaque zone is obtained by bulk coloring of the periphery of the interlayer.

According to a preferred embodiment of the invention, the thermoplastic interlayer comprising an opaque zone is obtained by juxtaposition of an opaque colored thermoplastic interlayer frame and of a central part formed of a transparent interlayer, it being possible for the opaque frame and the central part of the thermoplastic interlayer to be in an identical or different thermoplastic material, one being colored and the other uncolored.

According to a specific embodiment of the invention, the dimensions of the opaque zone are similar to those normally used for an enamel layer. It is understood that they can be greater or lower than those of the enamel layer, the aim being for the opaque zone to be sufficiently wide to conceal the elements glued to the glazing, such as busbars, connections, and the like.

According to a specific embodiment of the invention, the thermoplastic interlayer comprising a zone that is opaque to visible wavelength radiation according to the invention is positioned substantially on the surface of the glazing.

The insertion of the functional film into the laminated glazing is preferably facilitated by the installation of a housing put into at least one interlayer. Thus, advantageously, the laminated glazing additionally comprises a second thermoplastic interlayer framing the functional film. Preferably, the second thermoplastic interlayer is preferably a sheet of polyvinyl butyral (PVB). The functional film then has a smaller size than that of the glass sheets between which the film will be laminated. The functional film is then placed in a region precut from the second thermoplastic interlayer so as to promote its lamination between the two glass sheets and to prevent the formation of bubbles in the laminated glazing.

According to a specific embodiment of the invention, the first and second glass sheets are laminated by virtue of at least three thermoplastic interlayers. In this specific configuration, the first thermoplastic interlayer is the thermoplastic interlayer comprising an opaque zone which is positioned on the face 2 of the laminated glazing according to the invention, the second interlayer is a thermoplastic interlayer framing the functional film and the third thermoplastic interlayer is positioned on the face 3 of the laminated glazing according to the invention. In this specific embodiment of the invention, at least one of the three thermoplastic interlayers is chosen from a copolymer of polyvinyl butyral or of ethylene/vinyl acetate, or of polyurethane, or of polycarbonate.

Advantageously, additional thermoplastic interlayers can be positioned between the functional film and the glass sheets.

Such a design using at least three thermoplastic interlayers, including one framing the functional film, can be particularly advantageous in laminating an electrically powered functional film, the thickness of which is greater than approximately fifty microns.

Advantageously, additional thermoplastic interlayers are positioned between the functional film and the second glass sheet.

The control of the functional film can comprise simple switches or also sensors placed between the functional film and the second glass sheet or on the face 4 of the laminated glazing. If it is desired to position a switch on the glazed roof itself, it is desirable for it not to obstruct the transparency, the reason for the choice of glazed roofs.

The invention provides for the use of means for controlling the functional film which are also essentially transparent. For this purpose, the invention provides for the use of switches, the operation of which is triggered via relays actuated by a pulse associated with an electrical quantity. Preferably, the switch used is of the capacitive type. This mode is that which makes it possible to make best use of the actual structure of the elements included in the roof. By way of indication, a capacitive sensor may be of direct contact type. The sensitive element is, for example, a zone delimited in a low-e layer located on the face turned toward the passenger compartment. Since the low-e layers are conductive, they can be used as sensor for controlling the switch relay. The advantage of the direct contact is that the modification to capacitance induced by contact can be relatively large so that the threshold controlling the switch can be sufficiently high to exclude any interfering triggering.

According to the invention, the means for reflecting infrared radiation provided in the laminated glazing is preferably a layer reflecting infrared radiation. Thus, in order to remain under suitable energy transmission conditions, the glazings according to the invention comprise thin layers reflecting infrared radiation. Such layers are in particular those comprising one or more thin metal layers, in particular based on silver, in combination with thin dielectric layers which contribute in particular to the selectivity of the filter. These combinations of layers are positioned either on a support sheet, in particular of PET, inserted into the laminate or by direct application to the glass sheet. In both cases, this means for reflecting infrared radiation is located in the laminate above the functional film, improving the protection of this film.

Such layers reflecting infrared radiation are used in numerous applications, in antisolar glazings or in low-e glazings. They generally consist of thin conductive oxide layers or better still, as much more effective, of metal layers which are sufficiently thin to be virtually transparent. In these means for reflecting infrared radiation are combined with dielectric layers which are also thin and transparent, which provide the assembly with the necessary selectivity. Generally, in order to improve this selectivity, which is accompanied by reflection which should be made as neutral as possible, the filters comprise a plurality of metal layers which are generally based on silver.

These metal layers can be applied by cathode sputtering techniques, which techniques are carried out on flat sheets. Consequently, this solution involves subjecting these layers to heat treatments during the shaping of this glass sheet.

The choice of the system of layers is advantageously that of systems having several silver layers, in order to obtain an effective means for reflecting infrared rays and which makes possible control of the coloring, in particular in reflection. A particularly effective assembly of layers is as described in the application WO 2011/147875. In this patent application, the recommended system comprises dielectric layers and three silver layers, the assembly being chosen, in particular the thicknesses of the silver layers, so that the coloring in reflection is satisfactory even under low incidences of observation.

According to the invention, the means for reflecting infrared radiation is provided on the face 2 of the laminated glazing between the external glass sheet and the functional film, that is to say the internal face of the first glass sheet. In addition, it can also be provided on one of the faces of the second glass sheet comprised in the laminated glazing.

Generally, the one or several layers from which the infrared-reflecting film is formed are of the order of a few tens of nanometers in thickness.

In order to avoid the risks of corrosion of the layer reflecting infrared radiation, the layer does not extend up to the ends of the glass sheet; the zone separating the edge of the glazing from the beginning of the layer reflecting infrared radiation is commonly known as "edge deletion".

According to a preferred embodiment of the invention, the functional film is placed at a certain distance from the edge of the laminated glazing and in particular from the "edge deletion" zone. This minimum distance, which depends on the length of the "edge deletion" zone, makes it possible to dissipate the heat and thus to protect the functional film.

As alternative to the metal layers on the base described above, the layer reflecting infrared radiation can comprise a plurality of nonmetal layers, so that it operates as a band-pass filter (the band being centered on the near infrared region of the electromagnetic spectrum).

Thus, during the use as glazing for a motor vehicle, the laminated glazing according to the invention can be described as comprising an external glass sheet and an internal glass sheet, a means for reflecting infrared radiation provided between the external glass sheet of the laminated glazing and the functional film, which reduces the amount of infrared radiation which might otherwise be incident on the functional film and thus damage it.

In the laminated glazings of the prior art comprising a functional film and a means for reflecting infrared radiation and in particular when this means is a metal layer, the metal layer is applied to the face 2 after the enamel layer. In this embodiment of the prior art, the amount of infrared radiation which can be conducted toward the functional film is greater in comparison with the invention. The layer reflecting infrared radiation is, according to the invention, in direct contact with the glass sheet and is provided before the interlayer comprising an opaque zone. Thus, according to the invention, the layer reflecting infrared radiation plays its role fully and uniformly. The amount of infrared radiation penetrating in particular at the edges of the glazing and consequently transmitted by conduction to the functional film, which are concealed by the opaque zone of the thermoplastic interlayer, is thus reduced. Thus, the opto-energetic characteristics in the opaque zone at the edges of the glazing, seen from the outside of the vehicle, are improved. In particular, by virtue of the invention, the energy reflection is less than 60%, preferably less than 55% and more preferably still less than 50%. The reflection in the infrared region is greater than 70%, preferably greater than 80% and more preferably still greater than 85%. The light transmission in this opaque region is preferably less than 5% and preferably 0%. These properties make it possible to guarantee good attractiveness of the exterior of the vehicle (hides connections, and the like) and, at the same time, to prevent overheating of the roof due to the solar radiation in this zone.

Furthermore, the components of the functional film can be degraded by excessive exposure to UV radiation. The choice of the interlayers makes it possible to considerably restrict this exposure. This is the case in particular of the use of PVB interlayers, which by nature screens out UV radiation, allowing only a very small proportion of the latter to pass. For PVB films with a thickness of 0.38 mm, more than 95% of the UV radiation is suppressed. This proportion can exceed 99%. Polymers based on ethylene/vinyl acetate (EVA) are also proposed which include components conferring on them a very low transmission of UV radiation.

Advantageously, the at least one thermoplastic interlayer and in particular the nonopaque zone is a thermoplastic interlayer which screens out UV radiation, also known as "UV-cut".

The presence of a glazed roof modifies the conditions of thermal comfort for the occupants of the vehicle. Although heating when the vehicle is exposed to the sun leads to the conditions indicated above, for the passengers the presence of glazed roofs can also lead to what is described as a "cold shoulder" feeling when the exterior temperature is lower than comfortable ambient temperatures. This feeling is caused by a loss of heat from the passenger compartment, by the emission of far infrared radiation.

In order to minimize the loss of heat, low-e layers are provided on the face of the glazing turned toward the passenger compartment. In the conventional designation of the faces of laminated glazings, it concerns position 4. The layers in question act as a filter which selectively reflects the far infrared rays emitted from the passenger compartment, without forming a significant obstacle to the transmission of the rays of the visible region from the exterior toward the interior.

The presence of thin layers in position 4 is chosen despite the fact that, in this position, the layers are not protected from detrimental changes, in particular detrimental mechanical changes. It is possible to choose low-e layers which offer a sufficient mechanical strength and chemical resistance.

Advantageously, in view of the importance of having available coatings of good mechanical strength, "hard" layers, such as those produced by techniques of pyrolytic, CVD or PECVD type, are chosen. However, low-e systems can also be prepared by vacuum cathode sputtering techniques, provided that these systems are protected by layers which are sufficiently resistant.

According to the invention, it is preferred to use a system of low-e layers, the emissivity of which is less than 0.3 and preferably less than 0.2 and particularly preferably less than 0.1.

The commonest pyrolytic low-e systems comprise a layer of doped tin oxide deposited on a first layer having the role of neutralizing the color in reflection. The layer in contact with the glass is ordinarily a layer of silica or silicon oxycarbide, optionally modified by additives. Tin oxide layers, compared with the layers of the systems deposited by cathode sputtering, are relatively thick, more than 200 nm and for some more than 450 nm in thickness. These thick layers are sufficiently resistant to withstand exposure to mechanical and/or chemical ordeals.

The functional film according to the invention is electrically powered. It is necessarily connected to the general electrical power supply of the vehicle starting from the edges of the glazing. The connecting electrical lines are not normally transparent. In order not to disturb the transparency, even limited, of the glazing, it is necessary to conceal these lines in the peripheral zones of the glazing, which comprise, according to one implementation of the invention, an opaque zone formed by a thermoplastic interlayer intended in particular to conceal the irregular marks of gluing of the glazing to the body and to protect the functional film from heat.

In addition, the thermoplastic interlayer comprising an opaque zone can have properties of reflecting infrared radiation and/or acoustic insulation properties (commonly known under the name of an "acoustic interlayer" material).

According to a preferred embodiment of the invention, the functional film makes it possible to vary the light transmission of the glazing incorporating the film.

The choice of the LC (or PDLC) films in laminated roofs makes it possible to satisfy the need for the private nature and the absence of glare.

When the LC film is subjected to the electric field in the active mode, the degree of scattering, in a known way, can be adjusted as a function of the electric field applied. The orientation of the crystals is directly dependent on this field. The increase in the field remains limited to what the films can withstand without risk of breakdown, corresponding to a short circuit between the electrodes which cover the functional material composed essentially of polymer containing the liquid crystals. The voltage which can be withstood can depend in part on the thickness of the film. For the reasons indicated above, this thickness is limited. Under these conditions, the voltage which can be withstood for the normal films is of the order of 220 V.

For the composition of the roofs, it is preferable to limit the light entering the passenger compartment. The light can be relatively low without frustrating the wishes of the users. The choice this limitation of the light flux, transmitted or scattered, is also due to the fact that it results in the limitation of the penetration of heat. While the infrared rays are a major vector of the energy entering the passenger compartment, another very important part accompanies the radiation in the visible region. It is thus necessary, in order to control the energy flux, to substantially reduce the part of the visible radiation which crosses the glazing.

Advantageously, the glazings according to the invention are made up so that the light entering by transmission and scattering in the activated state of the LC film is not greater 50% of the incident light and preferably less than 40%, indeed even 30%. This proportion can be much smaller. Nevertheless, the glazings according to the invention advantageously exhibit an overall degree of transmission and scattering in the activated state of the LC film which is not less than 5% and preferably not less than 10%.

The presence of the LC film makes it possible to adjust the transmission scattering assembly according to the activated or nonactivated state of the electric field. In the case of the glazings comprising an LC film, the most important is the fact that an entirely scattering and thus essentially translucent assembly is changed to a state in which the light transmitted comprises only a low fraction of scattering as indicated above. Nevertheless, the passage from one state to the other is also accompanied by a variation in the light flux entering the passenger compartment. Depending on this change of state and taking into account all of the absorptions put in as indicated above, the ratio of light entering in the activated state in the nonactivated state is advantageously at least 1.5 and preferably at least 2. This ratio is virtually also re-encountered in that of the energy transmissions.

In order to achieve the light transmissions indicated above, at least one of the glass sheets used in the glazing is colored. Advantageously, as indicated below regarding the examples, both glass sheets are colored. The glazing can also include colored interlayers which contribute to the establishment of the desired optical conditions. Advantageously, a colored sheet is chosen so that, under a thickness of 4 mm, its transmission is not greater than 50%.

Thus, colored thermoplastic interlayers can be superimposed so as to obtain a specific color or specific optical conditions.

The presence of colored sheets in the glazings comprising an LC film also contributes to restoring colors which are satisfactory. Generally, the LC films tend to exhibit a slightly yellow coloration, in particular in reflection. It is desirable, in order to prevent this aspect perceived by the passengers of the vehicle, to see to it that the glass sheet and/or an interlayer positioned between the LC film and this glass sheet turned toward the passenger compartment is colored so to conceal this yellow hue. Generally, a glass sheet and/or an interlayer of neutral coloring, preferably gray or bluish-gray coloring, is chosen.

An SPD can also be chosen so as to satisfy the requirement for the private nature and for the absence of glare. An SPD is a film comprising a plurality of particles in suspension in a liquid suspending medium, which are held in a polymer medium.

The film can switch between a dark state (in the absence of voltage is applied) and a highly transparent state (when a voltage is applied).

The relative degree of alignment between the particles is determined by the alternating voltage applied, so that a device based on SPDs exhibits a variable optical transmission when a variable voltage is applied.

The SPD film in a laminated glazing structure can represent all or a portion of an intermediate layer between the two glass sheets.

According to a specific embodiment of the invention, the functional film according to the invention can comprise light-emitting diodes. There exist numerous light-emitting diodes known in the state of the art which can be used in accordance with the present invention.

Moreover, a subject matter of the invention is a process for manufacturing a laminated glazing as described above.

The advantages of this process are the same as those of the devices; they are not described more fully in detail.

The invention also relates to the use of at least one thermoplastic interlayer comprising a zone that is opaque to visible wavelength radiation, for protecting from heat a functional film which can be detrimentally affected at high temperatures, said film being comprised between at least two glass sheets.

BRIEF DESCRIPTION OF THE DRAWINGS

For a better understanding, the present invention will now be described in more detail as nonlimiting example, with reference to the following figures, in which.

DETAILED DESCRIPTION

Figure 1:
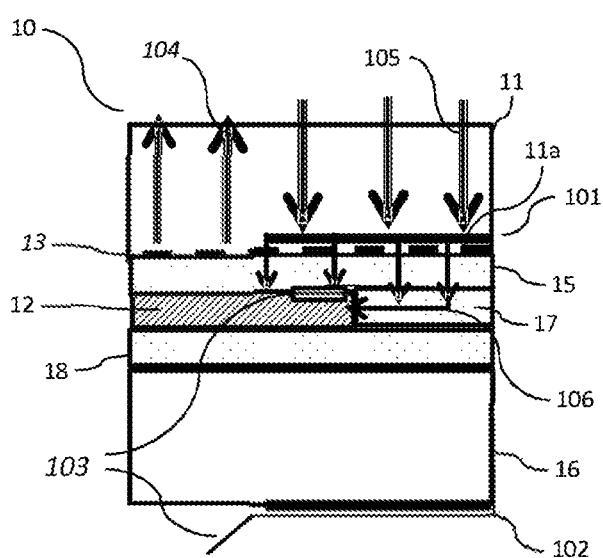
FIG. 1 shows a schematic plan view of a known glazing 10 of the prior art comprising a PDLC film laminated between 2 glass sheets.

FIG. 1 shows a known laminated glazing of the prior art, in the form of a glazed roof for a motor vehicle 10, comprising a functional film in the form of a polymer dispersed liquid crystal film 12 fitted inside the laminated structure. FIG. 1 does not show the curvatures of the sheets, for the sake of clarity. In practice, roofs, whether or not they are glazed, exhibit curvatures which are ordinarily more accentuated at the edges in the place where they join with the body for a fit chosen for its design, the aerodynamics and the flush appearance corresponding to a good surface continuity between the contiguous elements.

The functional film is a film of LC type consisting of a polymer containing the liquid crystals sensitive to the application of the electric voltage. The film is of PDLC (polymer dispersed liquid crystal) type. This laminated structure additionally comprises a sensor sensitive to the application of the electric voltage so as to activate the PDLC film (not shown), it being possible for such a sensor to be placed between the PDLC and the second glass sheet.

The polymer dispersed liquid crystal (PDLC) film 12 is represented as being positioned close to the edges of the glass sheets 11 and 16 of the glazing 10 but they might be positioned anywhere inside the glazing, for example at the center. However, in order to protect the PDLC film inside the laminated glazing, it is preferable for the edges of the film not to reach the edges of the glass sheets 11 and 16.

Figure 3:
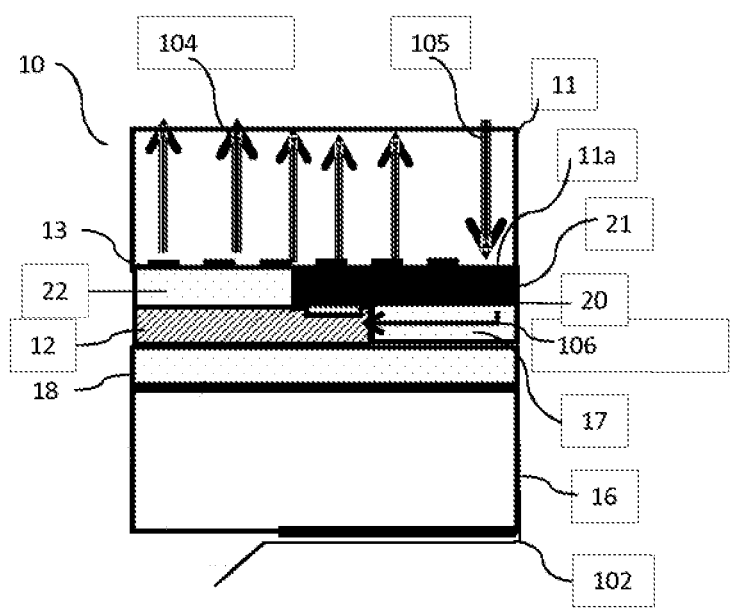
FIG. 3 shows a schematic plan view of a glazing 10 according to the invention comprising a PDLC film laminated between 2 glass sheets and a thermoplastic interlayer comprising a zone that is opaque to zones that are opaque to visible wavelength radiation.

The PDLC film is "framed" by a PVB frame 17 (corresponding to the second thermoplastic interlayer described above) and is laminated between two thermoplastic interlayers 15 and 18 (respectively corresponding to the first and third thermoplastic interlayers); this assembly is itself laminated between an external glass sheet 11 and an external glass sheet 16. The thermoplastic interlayer 18 is added so as to ensure sufficient adhesion between the PDLC film 12 and the exterior window glass sheet 16. It is known to use a design in which a "frame" frames the functional film, itself laminated between two thermoplastic interlayers, in order to laminate a functional film within a glazing. According to a specific embodiment of the invention and as illustrated by FIGS. 1 and 3, the thermoplastic interlayers 15 and 18 are made of PVB but, of course, they can be in any other material capable of making possible the lamination of the functional film between two glass sheets. The thermoplastic interlayers 15 and 18 are coextensive with the glass sheets 11 and 16. The PDLC film exhibits a thickness of 0.38 mm.

Around the periphery of the glazed roof for a motor vehicle 10 is positioned, on faces 2 and 4, an occultation strip 101 and 102, more specifically an enamel layer, the role of which is, on one hand, to conceal and protect the tightness material (not represented) which is used to attach the window in a vehicle (not represented) and, on the other hand, to conceal the electrical connections (busbars, and the like) which provide electrical energy to the polymer dispersed liquid crystal film 12. The layer reflecting infrared radiation 13 of silver metal layer type makes it possible to reflect the infrared radiation 104 originating from the PDLC film. According to a specific embodiment of the invention, the means for reflecting infrared radiation 13 can consist of multiple alternating layers of silver and of indium oxide. Alternatively, the film reflecting infrared radiation 13 can be a nonmetallic film, composed of several layers. However, due to the presence of the enamel layer 101 at the periphery of the glass sheet on face 2, the infrared radiation originating from the outside of the glazing, for example originating from the lamination process or also from solar radiation, is absorbed by the external glass sheet 11. The heat is then conducted 106 through the external glass sheet 12, the first thermoplastic interlayer 15 and the thermoplastic interlayer frame 17 to be finally captured by the PDLC film, then resulting in its deterioration. The temperature of the PDLC can then reach a temperature of greater than 100° C., a high temperature which in the long run damages the PDLC film. If the laminated glazing is subjected to prolonged exposure to heat, the zone located at the edge of the functional film (PDLC, SPD, and the like) can be damaged and result in a detrimental change in the switching function, for example. In addition, other thermoplastic interlayers may be placed between the PDLC film and the second glass sheet 16 so as to ensure the assembling of the laminate.

The glass sheets 11 and 16 as illustrated in FIGS. 1 and 3 are glasses of soda-lime-silica type. One or both glass sheets can be sheets of clear glass of soda-lime-silica type with the following composition (by weight): $SiO_2$ 68-75%; $Al_2O_3$ at 0-5%; $Na_2O$ 10-18%; $K_2O$ at 0-5%; MgO 0-10%;

CaO 5 to 15%; SO$_3$ 0-2%. The glass can also contain other additives, such as, for example, refining adjuvants, in an amount ranging up to 2%.

According to a specific embodiment of the invention, one or both glass sheets 11, 16 can be sheets of strongly absorbing colored glass, so that the light transmission is limited by the effect alone of these two glass sheets, for example to less than 50%, and in a configuration of this type preferably to less than 30%.

Glasses used for these sheets are, for example, gray glasses, such as described in the patent FR 2 738 238 or in the patent EP 1 680 371, or green-hued gray glasses, such as described in EP 887 320, or blue-hued gray glasses, as in EP 1 140 718.

In one example, the glass sheets 11 and 16 are respectively 1.6 mm and 2.6 mm in thickness. According to a specific embodiment of the invention, the internal glass sheet of the laminated glazing can be made of glass colored throughout, the composition of which can comprise one or more of the following colorants: iron oxide, cobalt oxide, selenium, chromium oxide, titanium oxide, manganese oxide, copper oxide, vanadium oxide or nickel oxide. It is understood that the two glass sheets can be made of clear glass. One or the glass sheets can be made of tempered glass. The glass sheets can be flat or curved. Each glass sheet can have a thickness of between 0.5 and 25 mm in thickness, preferably between 1 and 5 mm. The total thickness of the motor vehicle glazing can thus be between 1.5 and 100 mm, preferably between 2 and 50 mm and more preferably between 2.5 and 20 mm. Preferably, the glazing has a transmission of visible light (measured with the CIE illuminant A) of greater than 70% and more preferably of greater than 75% when the two glass sheets and the layers of thermoplastic interlayer film are substantially clear. If the glazing overall exhibits a color (because either the internal glass sheet of the glazing is colored throughout or one or more folds of the intermediate layer material is colored), it preferably has a visible light transmission (measured by the CIE Illuminant A) of less than 40%, more preferably of less than 30% and preferably of less than 25%, and a total energy transmission (Parry Moon, Air Mass 1.5) of less than 30%, more preferably of less than 25% and preferably of less than 20%.

Figure 2:
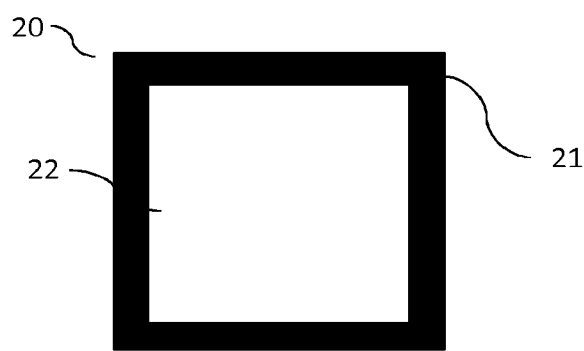
FIG. 2 shows a schematic plan view of a thermoplastic interlayer 20 comprising a zone 21 that is opaque to visible wavelength radiation, said opaque zone framing a non-opaque zone 22.

FIG. 2 shows the at least first thermoplastic film according to a specific embodiment of the invention. The thermoplastic interlayer 20 comprising an opaque zone 21 is found at the periphery of the thermoplastic interlayer 20. The interlayer film 20 is slightly greater in size than the glass sheets 11 and 16, so that it extends over the entire surface of the glass sheets. The opaque zone 21 according to this specific embodiment takes the form of a frame produced from a colored thermoplastic interlayer, the light transmission of which is 0%. In particular, the frame is produced from a black PVB surrounding the nonopaque zone 22 which it consists of a transparent PVB which screens out UV radiation, allowing only a very small proportion of the latter to pass. For PVB films with a thickness of 0.38 mm, more than 95% of the UV radiation is suppressed. This proportion can exceed 99%. Polymers based on ethylene/vinyl acetate (EVA) are also proposed which include components conferring on them a very low transmission of UV radiation. It is understood that any thermoplastic interlayer exhibiting these characteristics, namely a transmission of less than 5% and preferably equal to 0%, can be used to form this opaque zone. The dimensions of the opaque zone are generally equivalent to those normally used for the occultation strip. These dimensions will depend in particular on the zone to be concealed. Thus, the at least first thermoplastic interlayer as represented by FIG. 2 is formed of a frame of PVB colored throughout positioned on the circumference/periphery of a transparent PVB, so as to form the thermoplastic interlayer according to the invention. It is understood that this frame can be formed by different strips positioned so as to form said frame, these strips fusing during the stoving so as to form a single piece. However, it can be made up and applied using any other known means. The interlayer is subsequently provided on at least the face 2-11*a*—of the external glass sheet. It can, of course, also be provided on the face 4.

FIG. 3 shows a glazing according to the invention, in the form of a glazed roof for a motor vehicle 10, comprising a functional film in the form of a polymer dispersed liquid crystal film 12 fitted inside the laminated structure. The description of the glazing represented by FIG. 1 applies generally to that represented by FIG. 3, except for the fact that, in FIG. 3, a thermoplastic interlayer comprising a zone that is opaque to visible wavelength radiation is provided on the face 2-11*a*—of the glass sheet 11 (that is to say on the internal surface of the exterior window 11) between the means for reflecting infrared radiation and the PDLC film.

The polymer dispersed liquid crystal (PDLC) film 12 is represented as being positioned close to the edges of the glass sheets 11 et 16 of the glazing 10. The PDLC film does not cover the whole of the glazing, in order for the edges of the LC film not to come into contact with the exterior atmosphere, in particular in order to protect the crystals from moisture. In order to prevent any contact with the atmosphere, the PDLC film 12 is entirely enveloped in the different thermoplastic interlayers. The PDLC film is enveloped at its periphery by a PVB film 17 having a thickness similar to that of the PDLC film which exhibits an appropriate cutout in which the PDLC film will be housed (corresponding to the second thermoplastic interlayer described above) and is laminated between a first thermoplastic interlayer 20 and a third thermoplastic interlayer 18. In addition, other thermoplastic interlayers may be placed between the PDLC film and the second glass sheet 16 so as to ensure the assembling of the laminate. In one exemplary embodiment, the interlayers are PVBs, each with a thickness of 0.38 mm. The first thermoplastic interlayer 20 is positioned between the means for reflecting infrared radiation 13, itself deposited on the face 2-11*a*—of the external glass sheet 11, and the PDLC film 12. The thermoplastic interlayer 20 as represented by FIG. 2 comprises a zone 21 that is opaque to visible wavelength radiation and a nonopaque zone 22. In this example, the nonopaque zone 22 is formed of a transparent PVB film of 0.76 mm which screens out UV radiation. The zone 21 that is opaque to visible wavelength radiation for its part is formed by a "frame" of PVB film black in color (PVB colored throughout) which surrounds the nonopaque zone. Thus, the thermoplastic interlayer 20 is formed by a PVB frame black in color surrounding the nonopaque zone of transparent conventional PVB, so as to form an integrated PVB sheet which extends over the entire surface of the external glass sheet 11. The dimensions of the opaque zone are generally equivalent to those normally used for the occultation strip. These dimensions will depend in particular on the zone to be concealed.

In contrast to FIG. 1, the face 2-11*a*—of the external glass sheet is devoid of an enamel layer.

As indicated above, the components of the PDLC films may be sensitive to aging. In order to confer the desired aging on them, the film is normally protected by a means reflecting infrared radiation originating in particular from solar radiation. Such a means is positioned between the glass sheet 11 and the PDLC film 12. In this embodiment, the means reflecting infrared radiation acts well by reflecting, outside the glazing, the infrared radiation (104), thus protecting the PDLC from internal heating.

The infrared radiation originating from outside the glazing, for example originating from the lamination process or also from solar radiation, is then very slightly or not absorbed 105 by the opaque zone 21 of the first thermoplastic interlayer 20, thus preventing the PDLC film from being subjected to high temperatures. The heat conducted 106 by the glass sheet, then the opaque zone 21 of the thermoplastic interlayer 20 and then finally the thermoplastic film 17, in order to be captured by the PDLC film, is greatly reduced in comparison with the glazing of the prior art, as shown in FIG. 1. In addition, as shown in FIG. 3, an enamel layer may be present on the face 4 of the glazing, so as to conceal the connections, such as busbars and the connectors which provide electrical energy to the polymer dispersed liquid crystal film 11, or also the glue making it possible to glue these elements, and the like.

The means for reflecting infrared radiation 13 is identical to that represented in FIG. 2, namely a silver metal layer. According to a specific embodiment of the invention, the film reflecting infrared radiation 13 can consist of multiple alternating layers of silver and of indium oxide. Alternatively, the film reflecting infrared radiation 13 can be a nonmetallic film, composed of several layers.

The opto-energetic values, seen from the outside of the vehicle, in the opaque zone (black PVB) of the laminated glazing according to the invention, were measured. Thus, the energy reflection (ER) measured was 48.8%, the reflection in infrared radiation (RIR) was 89% and the light transmission (LT) was 0%.

These properties make it possible to guarantee good attractiveness of the exterior of the vehicle (hides connections, and the like) and, at the same time, to prevent overheating of the roof due to the solar radiation in this zone.

By way of example, a glazing according to the invention exhibits the following structure, from the outside toward the inside:
- clear (indeed even extra-clear) glass sheet with a thickness of 2.1 mm
- a silver layer as means reflecting infrared radiation
- clear PVB sheet which screens out UV radiation with a thickness of 0.76 mm, surrounded by a PVB frame of black coloring which is opaque to visible wavelengths
- gray PVB sheet of 0.38 mm
- PDLC film (with the means making it possible to power it electrically)
- a minimum of two thermoplastic interlayers including in particular the means for activation of the PDLC film
- clear glass sheet of 3.15 mm, coated with a system of low-e layers composed, as indicated above, of a silica layer covered with a doped tin oxide layer
- an enamel occultation strip.

The PDLC film is powered by AC current of 50 Hz and under a potential difference which rises to 110 V.

A laminated glazing according to the invention can be fitted into any window of a vehicle.

It can particularly and preferably be used as a motor vehicle glazed roof.

Furthermore, a laminated glazing according to the invention can be provided with an additional functionality, by inclusion of appropriate elements, such as a hydrophilic or hydrophobic coating on face 1 or face 4. For example, laminated glazings, as used as windshield or rear window of a motor vehicle, comprise numerous functionalities, such as: layer reflecting solar radiation, thus making it possible to lower the temperature of the dashboard and the ambient temperature in the passenger compartment, the interior rear-view mirror support, busbars making it possible to convey an electric current, a network of heating wires, an upper strip screening out solar radiation, having a possibly shaded coloring, a rain detector, and the like.

The invention claimed is:

1. A laminated glazing comprising:
   a. a first glass sheet,
   b. an electrically powered functional film,
   c. means for reflecting infrared radiation positioned between the first glass sheet and the functional film,
   d. at least one first thermoplastic interlayer positioned between the means for reflecting infrared radiation and the functional film,
   e. a second glass sheet,
   wherein the at least one first thermoplastic interlayer comprises a zone that is opaque to visible wavelength radiation.

2. The laminated glazing as claimed in claim 1, wherein the opaque zone extends over the periphery of at least one of the first and second glass sheets.

3. The laminated glazing as claimed in claim 1, wherein the opaque zone extends over the periphery of an internal face of the first glass sheet.

4. The laminated glazing as claimed in claim 1, wherein an energy reflection is less than 60% and a reflection in an infrared region is greater than 70% and a light transmission is less than 5%, these values being measured in the opaque zone.

5. The laminated glazing as claimed in claim 1, wherein the functional film can be detrimentally affected at a high temperature of greater than 60° C.

6. The laminated glazing as claimed in claim 1, wherein the at least one first thermoplastic interlayer is positioned substantially on a surface of the first glass sheet.

7. The laminated glazing as claimed in claim 1, wherein the at least one first thermoplastic interlayer is formed by an opaque zone, a light transmission of which is less than 5% of an incident light.

8. The laminated glazing as claimed in claim 1, wherein the at least one first interlayer is formed from an opaque frame positioned around a nonopaque zone.

9. The laminated glazing as claimed in claim 1, wherein the at least one first thermoplastic interlayer is a sheet of polyvinyl butyral or of ethylene/vinyl acetate.

10. The laminated glazing as claimed in claim 1, wherein the opaque zone is obtained by a bulk coloring of a periphery of the at least one first thermoplastic interlayer.

11. The laminated glazing as claimed in claim 1 wherein the functional film is a film having liquid crystals or a film having particles dispersed in suspension.

12. The laminated glazing as claimed in claim 1, wherein the means for reflecting infrared radiation consists of an assembly of thin silver-based layers.

13. The laminated glazing as claimed in claim 1, wherein the glazing is a glazed roof for a motor vehicle.

* * * * *